United States Patent [19]
LaClair et al.

[11] 3,890,231
[45] June 17, 1975

[54] INTEGRAL CIRCULAR WASTEWATER TREATMENT PLANT

[75] Inventors: Louis Maynard LaClair, Grand Island, N.Y.; John Ruben McWhirter, Westport, Conn.; William Lawrence Ross, Charlestown, W. Va.

[73] Assignee: Union Carbide Corporation, New York, N.Y.

[22] Filed: Apr. 2, 1973

[21] Appl. No.: 347,398

[52] U.S. Cl. ............... 210/199; 210/205; 210/220; 210/530
[51] Int. Cl. ............................................. C02c 1/06
[58] Field of Search ................... 210/3–7, 14, 210/15, 63, 197, 200–202, 209, 256, 260, 525, 527, 530, 218–221, 523, 528, 199, 205; 261/84

[56] References Cited
UNITED STATES PATENTS

| | | | |
|---|---|---|---|
| 584,736 | 6/1897 | Goodhue | 210/200 |
| 2,027,370 | 1/1936 | Currie | 210/201 X |
| 2,506,927 | 5/1950 | Kelly | 210/197 |
| 2,901,114 | 8/1959 | Smith et al. | 210/205 X |
| 2,963,430 | 12/1960 | Schreiber | 210/4 |
| 3,733,264 | 5/1973 | Spector et al. | 210/7 |

FOREIGN PATENTS OR APPLICATIONS

| | | | |
|---|---|---|---|
| 1,037,843 | 8/1966 | United Kingdom | 210/199 |

*Primary Examiner*—Roy Lake
*Assistant Examiner*—Craig R. Feinberg
*Attorney, Agent, or Firm*—S. J. Hultquist

[57] ABSTRACT

The plant includes circular outer and inner walls, first and second radial partitions across the intermediate volume spaced to form a first arcuate clarifier portion and a second arcuate portion, first and second covered aeration zones with gas and liquor passages therebetween, and means for uniformly distributing oxygenated liquor around the clarifier inner wall for radial flow toward the outer wall.

14 Claims, 17 Drawing Figures

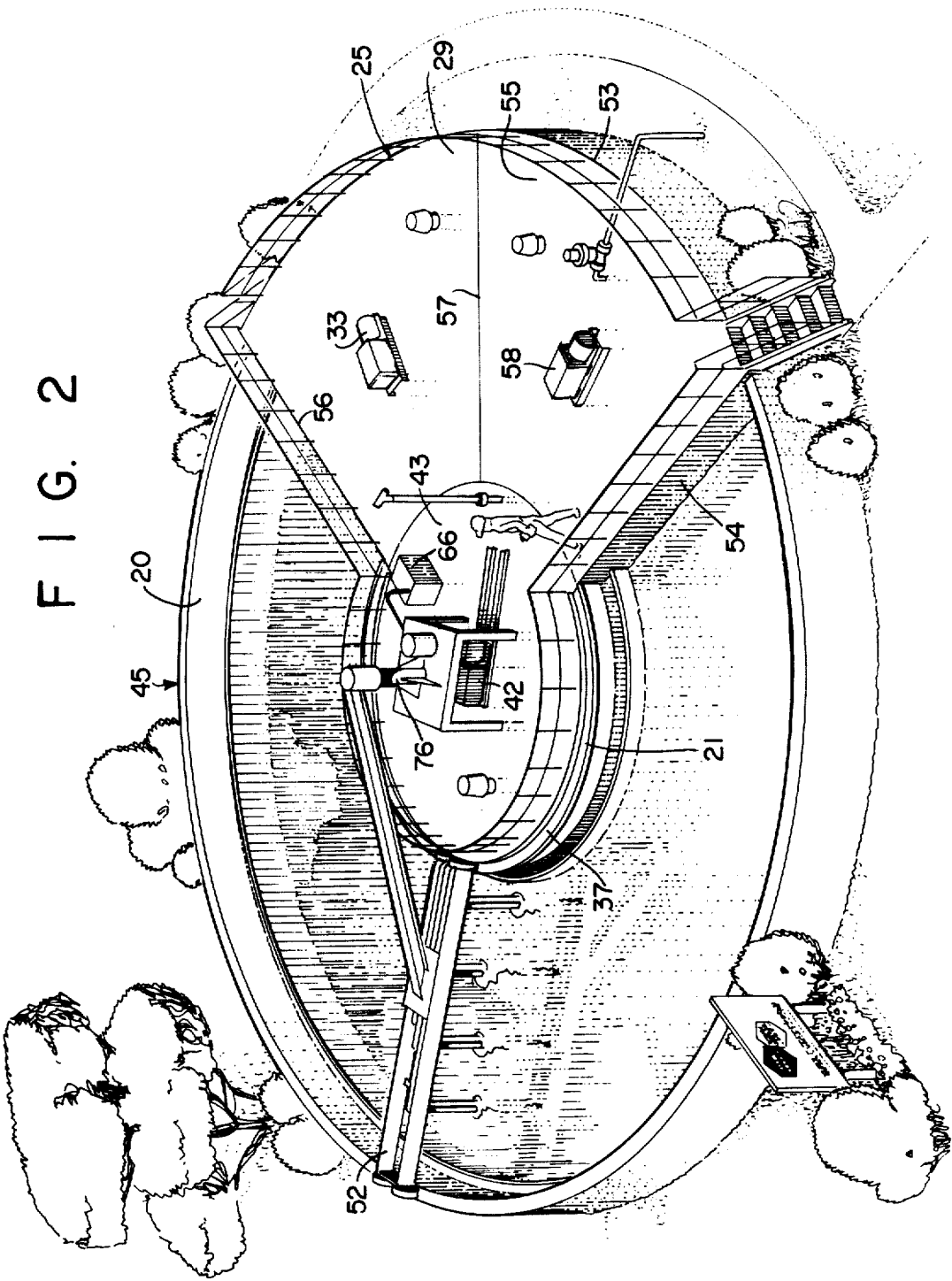

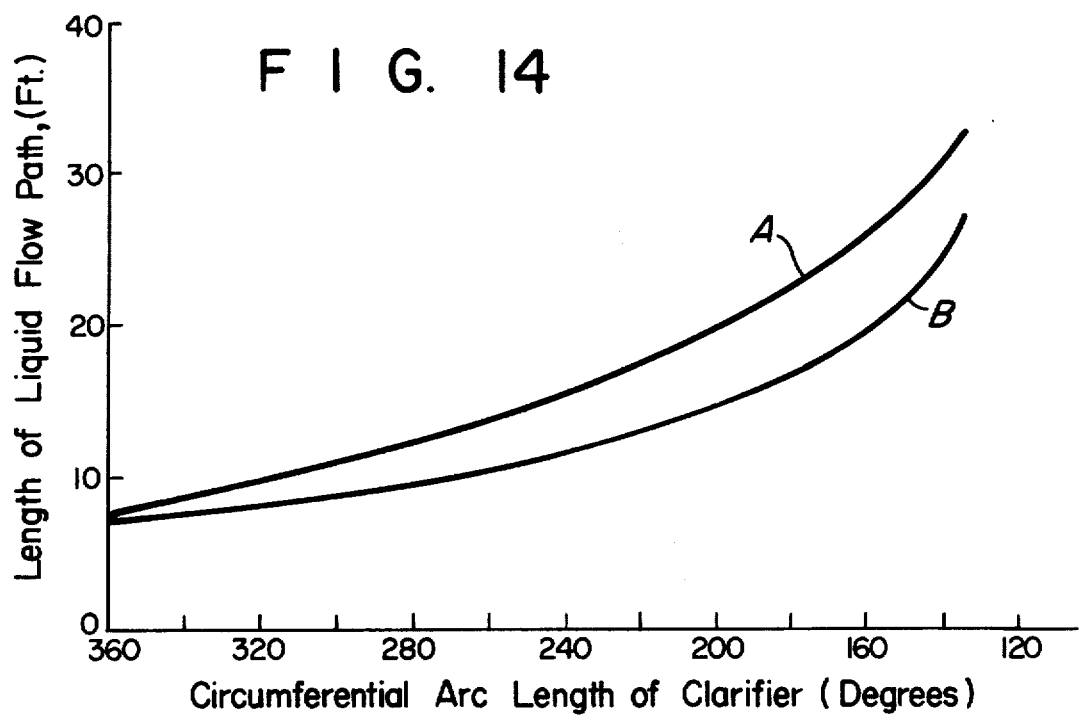
F I G. 14
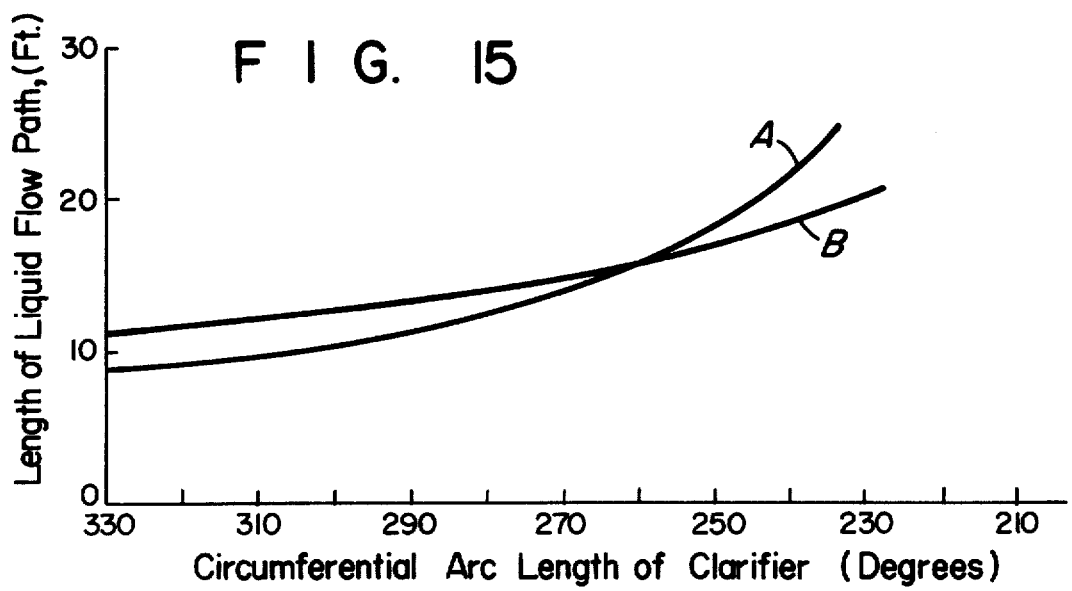
F I G. 15

INTEGRAL CIRCULAR WASTEWATER TREATMENT PLANT

BACKGROUND OF THE INVENTION

This invention relates to a method of and apparatus for treating wastewater by aeration with at least 50 percent oxygen in an integral circular plant.

In areas where small flows of wastewater require treatment it is desirable to employ integral plants, i.e. plants in which all components are enclosed in a single outer wall. The cost of material and fabrication are lower for a relatively small integral wastewater treatment plant than for a plant comprising physically separate elements. Moreover, integral plants are compact and require a small land area for installation; such a plant also has a potential for much more simplified overall design as compared to a non-integrated facility.

Notwithstanding the requirement of being relatively small, the integral plant must maintain the desired level of wastewater treatment, i.e. the geometries of the constituent segments must promote good performance. For example, the mixing or aeration segments must promote efficient flow patterns and distribution of contained liquor; the clarifier must promote a low BOD content - effluent water and thickening of sludge underflow.

The prior art has made extensive use of circular plants for relatively small wastewater flows as they offer several advantages over other configurations such as rectangular. By providing a minimum perimeter to cross sectional area ratio, circular design tends to minimize material requirements for fabrication of the integral plant while promoting a highly efficient component arrangement. Additionally, construction costs may be less in some instances for circular geometries than for other shapes, as for example in concrete fabrication.

The prior art has employed biological treatment processes in small circular plants, primarily because of their applicability to a wide variety of wastewaters and effluent requirements and comparatively low capital cost. The major biological treatment process in commercial use is based on activated sludge, in which wastewater is mixed in an aeration zone with oxygen-containing gas and the activated sludge. The latter consists essentially of aerobic organisms which in the presence of dissolved oxygen, absorb and assimulate the biochemically oxidizable organic content (BOD) of the wastewater, converting the organic material to forms which can readily be separated from the purified water in the clarification zone. Under normal conditions the organisms multiply rapidly in the aeration zone and when the requisite period of BOD conversion is complete, the mixed liquor is settled in a clarifier zone and the purified effluent decanted to receiving waters. Sludge is withdrawn from the bottom of the clarifier zone with part thereof being recycled to the aeration zone to maintain effective biological action on the influent wastewater.

Until very recently atmospheric air has been the sole source of oxygen in activated sludge plants. But in recent years this system has been vastly improved by the use of high purity oxygen gas as the oxidant in a series of closed rectangular tanks, preferably with staging of gas and liquor from tank to tank in the manner described in the U.S. Pat. Nos. 3,547,813, 3,547,814 and 3,547,815 all to J. R. McWhirter. The high purity oxygen aerated systems offer important advantages over air aerated plants as for example higher levels of biological action on influent wastewater therefore smaller aeration tanks.

The operation of clarification is greatly influenced by the type of aeration employed. Clarifiers in the activated sludge process have two functions: They must provide an effluent with a low level of suspended solids and must also thicken sedimentary solids and provide a sludge of sufficient concentration to maintain effective biological action in the aeration zone. The efficiency of the clarifier in performing these two functions depends largely on the physical nature of the solids in the liquor discharged from the aeration zone and here again the oxygen aeration process has distinct advantages over air aeration systems. The latter produces typically small-sized fragile, relatively unflocculated solids particles which do not settle well in the clarifier. Moreover, the settled sludge possesses a high specific volume as for example measured by the Sludge Volume Index (SVI) so that because of the poor settling characteristics and compactibility, a clarifier processing air aerated sludge must be comparatively large in size to insure adequate performance. Oxygen aeration systems by contrast produce sludge with superior settling characteristics, i.e. higher settling velocities, (lower SVI) and better dewatering ability.

In sizing clarifiers the dual functions of clarification and thickening must be separately considered and an overall area chosen which accomodates both requirements. It is further necessary to develop a clarifier design which is free from stagnant areas or short-circuiting flows. This is accomplished by providing a geometric form without sharp corners or regions inaccessible to the liquor flow, and uniform fluid flow patterns within the clarifier. Although the latter characteristic is primarily insured by distributing the influent liquor as uniformly as possible over the entire cross sectional area of the clarifier, it is also necessary to provide liquor flow patterns within the vessel which permit sufficient liquor residence time for sedimentation to occur. It is also desirable to provide a liquor flow path in the clarifier which brings the influent strength to a relatively quiescent state and thus minimize fluid velocities within the bulk fluid volume.

To effectively use the entire area provided in the clarifier, the length of the liquor flow path must be at least equal to and at peak flow conditions preferably identical with the path length necessary for sedimentation. If the sedimentation path is shorter than the actual path provided for liquor travel then distribution of solids will occur over only part of the clarifier area. Under these circumstances the clarifier has been over designed and the integral plant is larger than necessary. If the sedimentation path is longer than the actual path provided for liquor travel then a gross loss of solids may occur in the clarifier effluent. Unfortunately, the prior art air aeration integral circular plants with arcuate clarifier zones require the zone to extend around the entire periphery of the outer wall, i.e. 360°, for the liquor flow path length to be at least equal to the sedimentation path length. That is, foreshorting of the clarifier arc to less than the full circumference causes the sedimentation path length to exceed the actual liquor flow path length and substantially reduce the solids-liquid separation in the clarifier. This means that only the central portion of an air aerated integral circular plant is available as the aeration zone and the plant must be sized on the basis of the required aeration zone volume. The result of this severe limitation is a relatively large plant to process a given wastewater flow rate.

An object of this invention is to provide an improved method of and apparatus for biological treatment of wastewater in an integral circular plant.

Another object of this invention is to provide an activated sludge system employing high purity oxygen aeration for relatively low wastewater flow rates in an integral circular plant which is substantially more compact than rectangular configuration plants.

SUMMARY

This invention relates to a method of and apparatus for treating wastewater by aeration with at least 50 percent oxygen in an integral circular plant.

It has been unexpectedly discovered that in an oxygen aerated waste treatment system integral circular plant with a peripheral clarification zone, the clarifier arc length may be foreshortened to as little as 90° without causing the sedimentation path length to exceed the actual liquid flow path length. This means that the remaining peripheral portion of the plant may be employed for other purposes, as for example, aeration, digestion of the activated sludge, and chlorination of the clarifier effluent. To achieve the desired wastewater treatment with oxygen gas so as to effectively utilize the relatively expensive oxygen (compared to air), reduce the BOD content of the effluent to an acceptable level and obtain activated sludge having the aforementioned superior settling characteristics, it is necessary in the practice of this invention to employ at least two separate oxygen aeration zones with the oxygen depleted gas from the first zone being transferred to the second aeration zone and the first oxygenated liquor also being transferred to the second aeration zone. At least one aeration zone is provided in an arcuate portion of the plant, which portion is available due to the unique foreshortened clarifier arcuate portion. As used hereinafter the term "arcuate portion" refers to an enclosed part of the integral circular wastewater treatment plant bounded on the outside by a circular tank outer wall, on the inside by the circular inner wall, and on the ends by radially extended end walls with the circumferential length of the concentric inner and outer walls serving to define arc lengths of less than 360°.

The arc length of the clarifier zone of this plant may be as low as 90° and still provide an actual liquid flow path length at least as long as the sedimentation path length. From a theoretical standpoint, it should be possible (if desired) to employ a fully extended 360° clarifier zone in the integral circular waste treatment plant of this invention, since at this arc length the sedimentation path length based on idealized conditions is still less than the actual provided flow path length. However for such an arc length in a fixed diameter plant, the inner to outer wall distance in the clarifier is a minimum since the inner wall diameter must be increased to provide the entire required volume for at least two aeration zones. With such narrow clarifier portion widths the hydraulic effects associated with clarifier inlet and outlet disturbances become increasingly important and adversely effect clarifier performance. For this reason the clarifier arcuate portion should not exceed 330° so as to obtain suitably long inner to outer wall widths and satisfactory hydraulic conditions at the inner wall where oxygenated liquor is introduced and the outer wall where the clarified effluent is discharged.

In the integral circular wastewater treatment plant of this invention the oxygenated liquor from the final aeration zone is directed to means for uniformly distributing the same in the first arcuate portion of the intermediate volume between the inner wall segment thereof. That is, the oxygenated liquor flows radially outward from the inner wall to the outer wall and the actual liquor flow path length is therefore the radial distance between the walls. The final aeration zone is preferably within the circular inner wall as this location most readily accomodates the necessary radial flow in the clarifier arcuate portion. That is, restricted opening(s) may be provided in the inner wall to achieve the desired flow of oxygenated liquor from the final aeration zone to the first arcuate clarifier portion of the intermediate volume.

A third radial partition may extend across the intermediate volume between and joined at opposite ends to the inner and outer walls within the second arcuate portion so as to form another arcuate portion within the intermediate volume. The second aeration zone may then be located within the second arcuate portion and separated from the first aeration zone by the third radial partition.

The integral circular wastewater treatment plant of this invention offers substantial advantages over presently employed air aerated circular plants. By way of example and on the basis of a wastewater flow rate of 1 million gallons per day, the present plant requires only 47 percent of the ground area required by the air aerated plant. The instant plant also is substantially more compact than a rectangular type plant also employing oxygen aeration as for example described in the aforementioned McWhirter U.S. Pat. No. 3,547,815. Again based on a wastewater flow rate of 1 MGD, this circular plant would require an outer wall area of only 31 percent of the outer wall area required by a rectangular plant based on identical process conditions, corresponding to a wall length of 87 ft. for the circular plant and 280 ft. for the rectangular plant.

More specifically, the wastewater treatment apparatus of this invention comprises a circular tank outer wall, a circular inner wall concentric with and spaced from the outer wall forming an inner volume and an intermediate volume between the inner and outer walls such that the ratio of the inner wall radius ($R_1$) to the outer wall radius ($R_2$) is between 0.25 and 0.70. A first radial partition extends across the intermediate volume between and joined at opposite edges to the inner and outer walls, and a second radial partition also extends across the intermediate volume between and joined at opposite edges to the inner and outer walls. The second partition is spaced from the first radial partition so as to form a first arcuate portion of the intermediate volume bounded by segments of the inner and outer walls, comprising between 90° and 330° of their respective circumferences. A second arcuate portion comprises the remainder of the intermediate volume.

First fluid mixing and recirculation means are provided within the outer wall in a first part other than the first arcuate portion and a cover encloses this part positioned over the first fluid mixing and recirculation means to form a first aeration zone. First passage means introduce oxygen gas in the first aeration zone, and second passage means introduce feed wastewater and activated sludge to the first aeration zone.

Second fluid mixing and recirculation means are provided within the outer wall in a second part other than the first arcuate portion, and a second cover encloses the second part positioned over the second fluid mixing and recirculation means to form a second aeration zone.

First gas interzone transfer means are spaced from the oxygen gas first passage means for discharging oxygen-depleted gas from the first aeration zone and introducing same to the second aeration zone as the oxygen-containing gas therefor. First liquor interzone transfer means are provided for discharging first oxygenated liquor from the first aeration zone and introducing same to the second aeration zone for mixing therein witht the oxygen-containing gas. Gas vent means are spaced from the first gas interzone transfer means for discharging oxygen-further depleted gas from the second aeration zone. Liquor passage means discharge second oxygenated liquor from the second aeration zone and means are provided for uniformly distributing oxygenated liquor in the first arcuate portion of the intermediate volume around the inner wall segment for radial flow across said first arcuate portion. Trough means around the outer wall segment upper part of the first arcuate portion are employed for discharging clarified water, and means are included for collecting and removing activated sludge from the bottom part of the first arcuate portion and returning at least part of the sludge to the second passage means to the first aeration zone.

This invention also includes an improved method for waste water treatment. In a circular air aerated plant, the clarifier arc length may not be reduced below 360° in order to prevent the sedimentation path length from grossly exceeding the actual liquor path length. In such a plant, if oxygenated liquor were discharged from a central clarifier for radial outward flow towards the outer wall, the distribution area would be very large (due to the fully extended 360° wall) and the radial velocity of the liquor would be very low. However, because the settling velocity of air-aerated activated sludge is inherently low, the radial liquid velocity needs to be decreased to a value much lower than its inlet value in order to achieve good sedimentation. Within the geometric constraints of the overall package plant, this is not possible for the air system. Only a small degree of liquid expansion is possible, so that the radial liquid velocity is not substantially reduced.

In the method of this invention, the aeration volume, in addition to being significantly smaller than in the air system, is divided into at least two zones. This means that the central circular final aeration zone is small in size, and provides a small, localized distribution area for oxygenated liquor introduction into the arcuate clarification zone. The localized distribution area promotes high radial liquid velocities at the inner smaller diameter inlet arc, but, because of the long radial (actual) liquor flow path provided and the higher characteristic settling velocity of oxygenated sludge, sufficient expansion of the liquor is realized to achieve good sedimentation. The sedimentation path is thus contained by the actual provided radial flow path, because of the beneficial radial expansion of liquid in the clarifier.

More specifically, the waste water treatment method of this invention is by aeration with at least 50% oxygen gas in the presence of recycled activated sludge for biological oxidation in at least two covered aeration zones wherein the oxygen feed gas, waste water and activated sludge are mixed and one fluid is simultaneously recirculated in a first aeration zone, oxygen partially depleted gas and partially oxygenated liquor from the first aeration zone are each separately introduced to a second aeration zone for continuous mixing and fluid recirculation therein, and the further oxygenated liquor from the final aeration zone is separated into effluent water and activated sludge in a clarification zone with at least part of the sludge being returned to the first aeration zone as said recycled sludge. The improvement comprises: (a) mixing said oxygen feed gas, waste water and recycled activated sludge in an arcuate first aeration zone; (b) mixing oxygen partially depleted gas and partially oxygenated liquor in a circular final aeration zone; (c) flowing the further oxygenated liquor radially across an arcuate clarification zone of between 90°and 330°arc length from an inner smaller diameter inlet arc to an outer concentric larger diameter liquid effluent discharge arc at radial velocities and volumetric flow rates such that $V_E/V_I$ is between 0.1 and 0.5, wherein $$\frac{V_E}{V_I} = \left(\frac{Q}{Q+R}\right)_R \left(\frac{R_1}{R_2}\right), \text{ and}$$

$V_E$ = radial liquid velocity at said outer concentric larger diameter liquid effluent discharge arc,
$V_I$ = radial liquor velocity at said inner smaller diameter inlet arc,
Q = volumetric flow rate of liquid effluent from said clarification zone,
R = volumetric activated sludge recycle flow rate,
$R_1$ = radius of said inner smaller diameter inlet arc, and
$R_2$ = radius of said outer concentric larger diameter liquid effluent discharge arc.

BRIEF DESCRIPTION OF THE DRAWINGS

In the drawings

FIG. 2 is an isometric view of an integral circular wastewater treatment plant incorporating the invention.

FIG. 14 is a graph showing the clarifier performance of an air aerated circular plant processing wastewater of 250 mg/1 BOD in an aeration zone with total suspended solids concentration (MLSS) of 2200 mg/1.

FIG. 15 is a graph showing clarifier performance in an oxygen aerated circular plant processing wastewater of 250 mg/1 BOD at total suspended solids concentration (MLSS) of 5000 mg/1.

DESCRIPTION OF PREFERRED EMBODIMENTS

Figure 1:
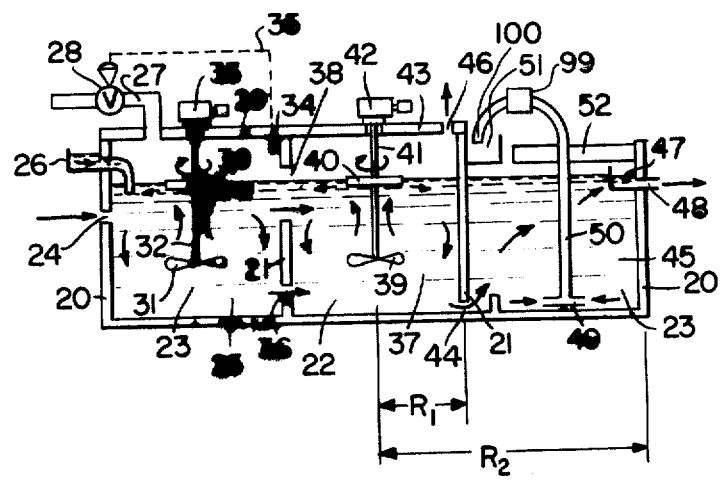
FIG. 1 is a schematic flow sheet of a wastewater treatment system in which the present invention may be practiced.

Referring more specifically to the drawings, FIG. 1 is a schematic flow sheet of a wastewater treatment system in which the present invention may be practiced, and includes circular tank outer wall 20 and circular inner wall 21 concentric with and spaced from outer wall 20 forming an inner volume 22 and an intermediate volume 23 between the inner and outer walls. The ratio of the inner wall radius $R_1$ to the outer wall radius $R_2$ is between 0.25 and 0.70. Wastewater is introduced through conduit 24 to first aeration zone 25, recycled sludge is also introduced to this zone through conduit 26 and at least 50 percent by volume oxygen gas is introduced to the same zone through conduit 27 having control valve 28 therein.

As illustrated, first aeration zone 25 is an arcuate portion of the plant and enclosed by overhead cover 29. First fluid mixing and recirculation means are provided in first aeration zone and comprise rotatable impeller 30 positioned at the liquor surface, sub-surface propeller 31 is positioned beneath the impeller, common shaft 32 joining the impeller and propeller and extending through cover 29, and motor drive means 33 connected to shaft 32 for rotation thereof. Propeller 31 performs the function of continuously sub-surface mixing of the fluids, while impeller 30 throws sheets of liquor outwardly against the gas and performs the continuous recirculation function (of liquor). If outer tank 20 is shallow, surface impeller 30 may perform both functions and sub-surface propeller 31 may be unnecessary. Other mechanical means for fluid mixing and recirculation may be employed, for example a system including a sub-surface propeller, a gas sparger, and a gas recirculation pump joined to the gas space above the liquor and beneath the cover. As discussed and illustrated in U.S. Pat. No. 3,547,815 to J. R. McWhirter, the gas sparger may be positioned at the bottom end of a hollow vertical rotatable shaft, with the propeller also mounted on the shaft above the sparger. The gas recirculation pump may be mounted on the cover with its inlet side joined to the gas space by a conduit through the cover. The pump discharge side is joined to the top end of the rotatable shaft for recirculation of oxygen gas to the sparger and thence into the liquor.

The sludge is recycled to first aeration zone 25 at rate so as to maintain the desired total solids concentration (MLSS) as for example 6000 mg/1 and volatile suspended solids concentration (MLVSS) as for example 4500 mg/1. Broad suitable ranges for these parameters are 4000-8000 mg/1 MLSS and 3000-6000 mg/1 MLVSS. The food-to-biomass ratio may be in the range of 0.5-1.55 gm $BOD_5$/day $\times$ gm MLVSS, for example about 0.68. The recycled sludge concentration (MLSS) is in the range of 15,000-50,000 mg/1. The oxygen gas is introduced in sufficient quantity to maintain dissolved oxygen concentration (DO) in the mixed liquor of 4-8 mg/1 and for example 6 mg/1. Oxygen control valve 28 may be automatically adjusted in response to sensed oxygen vapor pressure in the overhead gas space as monitored by sensor 34 and transmitting means 35.

The fluids in first aeration zone are mixed for the desired period, e.g. 45 minutes liquid residence time, and the resulting first oxygenated liquor is discharged through opening 36 in inner wall 21 to second aeration zone 37. Simultaneously, oxygen-depleted gas from the first aeration zone 25 is passed through first gas innerzone transfer means 38 to second zone 37 and the fluids are again mixed in this zone by second fluid mixing and recirculation means comprising propeller 39, impeller 40, shaft 41, and motor 42. Second aeration zone 37 is enclosed by cover 43, and the operating parameters may be substantially the same as previously discussed in connection with the first aeration zone 25. After the desired liquor residence time, as for example 45 minutes, the second oxygenated liquor is discharged from second zone 37 through liquid passage means 44 and to clarifier zone 45 bounded by inner wall 21, outer wall 20 and first and second radial partitions (not illustrated in FIG. 1). Oxygen-further depleted gas is discharged from second aeration zone 37 through gas vent means 46. It will be noted that the gas discharge means from each of first and second aeration zones 25 and 37 are spaced from the gas inlet means to these respective zones so as to avoid bypassing gradient.

The oxygenated liquor entering clarifier zone 45 flows radially across this zone towards outer wall 20 and the solids settle from the liquid during this radial path. Trough means 47 extend around the outer wall end segment of the clarifier 45 for discharging clarified water therefrom through conduit 48. As used herein, trough means 47 include any means for collecting and removing clarified water as for example the illustrated open conduit, or a submerged perforated conduit. Means are provided for collecting and removing activated sludge from the bottom part of clarifier 45 and returning at least part of same to first aeration zone 25 through the aforementioned means 26. The aforementioned may include sludge pick-up heads 49 each positioned near the bottom of clarifier zone 45, and vertical conduits 50 each with a lower end joined to a sludge pick-up head and an outer end 100 terminating above sludge trough 51. Bridge 52 extends across and above the clarifier zone and supports the pick-up head-vertical conduit assembly. Mechanical drive means (not illustrated) are provided for moving the bridge in an arcuate path repetitively around the clarifier between the two radial partitions. Pump means 99 are joined to conduit 50 for drawing sludge therethrough.

In the FIG. 2 embodiment, the first aeration zone 25 is a part of the second arcuate portion comprising the remainder of the intermediate volume other than the first arcuate clarifier portion 45. This first aeration zone 25 has cover 29 and motor 33 supported by the cover and employed for driving the first fluid mechanical mixing and recirculation means. The second aeration zone 37 is within inner wall 21 and enclosed by cover 43 supporting motor 42 for driving the second fluid mixing and recirculation means. The first arcuate clarifier portion 45 is uncovered and the bridge assembly 52 for supporting the sludge pick-up head-vertical conduit assembly is illustrated. An arcuate aerobic digestion portion 53 adjoins the first aeration zone 25 and separated from clarifier portion by first radial partition 54. First aeration zone 25 is separated from clarifier 45 by second radial 56 partition and the two covered arcuate portions (first aeration zone 25 and aerobic digestion zone 53) are separated from each other by third radial partition 57 extending to the floor of the plant between outer and inner walls 20 and 21. Fluid mixing and recirculation means are provided in aerobic digestion zone 53, and driven by motor 58 positioned on cover 55.

Figure 3:
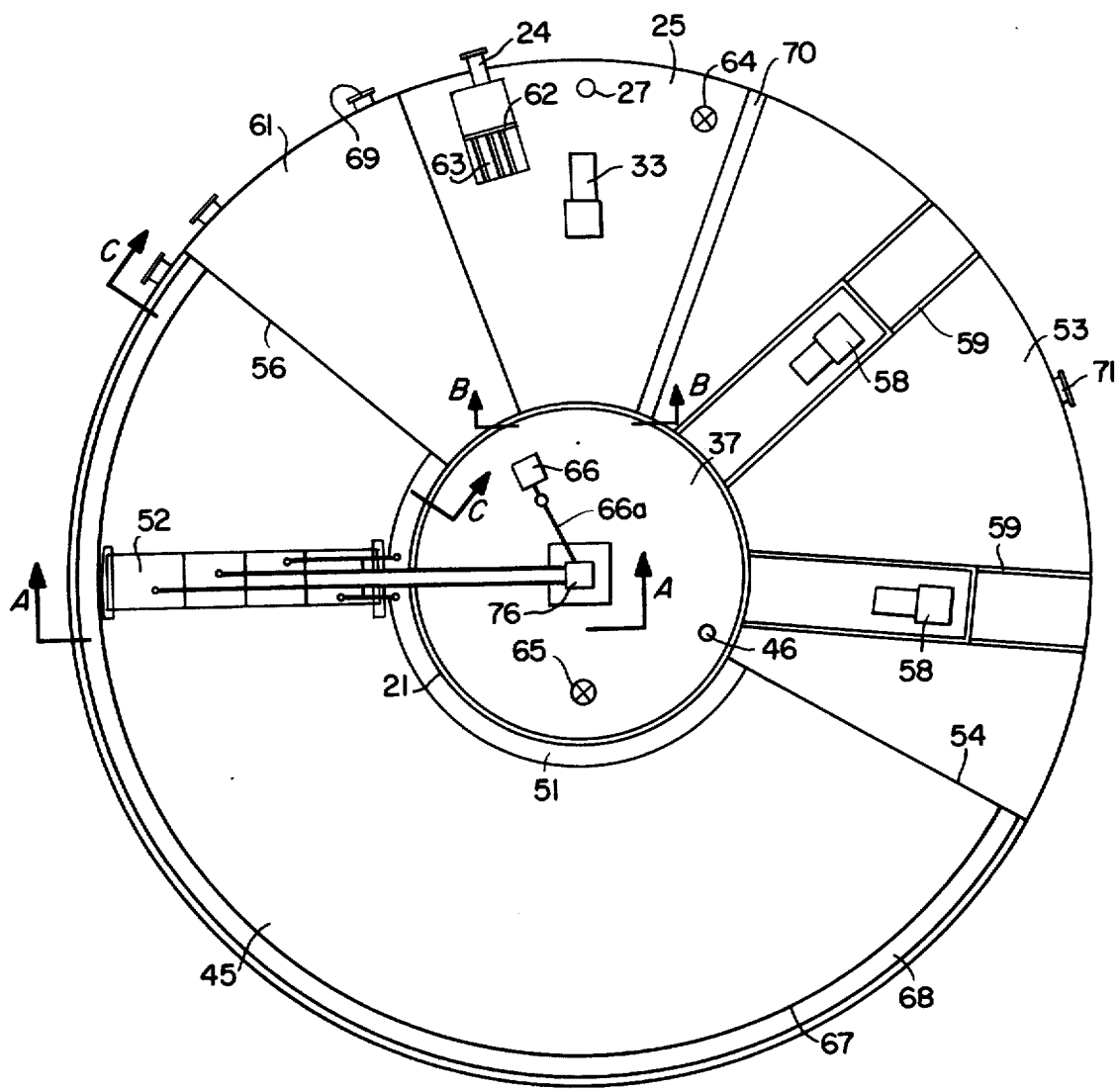
FIG. 3 is a plan view of a plant similar to the FIG. 2 plant showing a first arcuate aeration zone, a second center aeration zone, an arcuate aerobic disgestion zone and a 190°arcuate clarifier.

FIG. 3 is a plan view of an embodiment of this invention similar to the FIG. 2 plant showing arcuate first aeration zone 25, central second aeration zone 37, arcuate aerobic digestion zone 53, and 190°arcuate clarifier zone 45. Also included is arcuate chlorination zone 61. Feed wastewater is introduced to first aeration zone 25 through inlet conduit 24, stop gate 62 and bar screen 63. Oxygen feed gas is introduced through overhead conduit 27, and sludge recycled from clarifier 45 by overhead circular trough 51 extending around the outer periphery of inner wall 21 between first radial partition 54 and second radial partition 56. Slight positive gas pressure is maintained under the first aeration zone cover to prevent back mixing of gas between joining aeration zones 25 and 37. The first and second aeration zones are provided with pressure relief valves 64 and 65 respectively. The previously described mechanical fluid mixing and recirculation system promotes transfer of oxygen to the mixed liquor in the first aeration zone 25, the biomass assimulates and metabolizes BOD leading to production of $CO_2$, water and additional microorganisms. Oxygen is consumed and the gas purity in the space above the mixed liquor decreases. The partially oxygenated liquor and oxygen depleted gas are transferred to central second aeration zone 37 for further fluids mixing and recirculation. Oxygen further depleted gas is vented from second aeration zone 37 through conduit 46 and the oxygenated liquor flows radially outward across clarifier 45. Sludge collecting bridge and overhead manifold 52 move in an arcuate path between first and second radial partitions 54 and 56, with air lift blower 66 joined to manifold 51 as the needed suction for withdrawing sludge from the clarifier floor and discharging same into trough 51. The non recycled sludge is transferred by trough 51 to aerobic digestion zone 53, also provided with mechanical fluid mixing and recirculation means similar to the corresponding means used in the first and second aeration zones. The aforementioned mixing-recirculation means and drive motor 58 may be supported on bridges 59. Oxygen gas may be supplied to the aerobic digestion zone from an external source or at least in part from the second aeration zone vent. The clarified water flows over effluent weir 67 into trough 68 extending around the inner perimeter of the clarifier zone 45. This effluent flows into chlorination zone 61 for disinfection and is then discharged through effluent conduit 69.

Solids digestion is carried out in zone 53 with supernatant liquid being returned if desired to first aeration zone 25 through stilling well 70. Waste sludge is discharged from digestion zone 53 through conduit 71.

Figure 4:
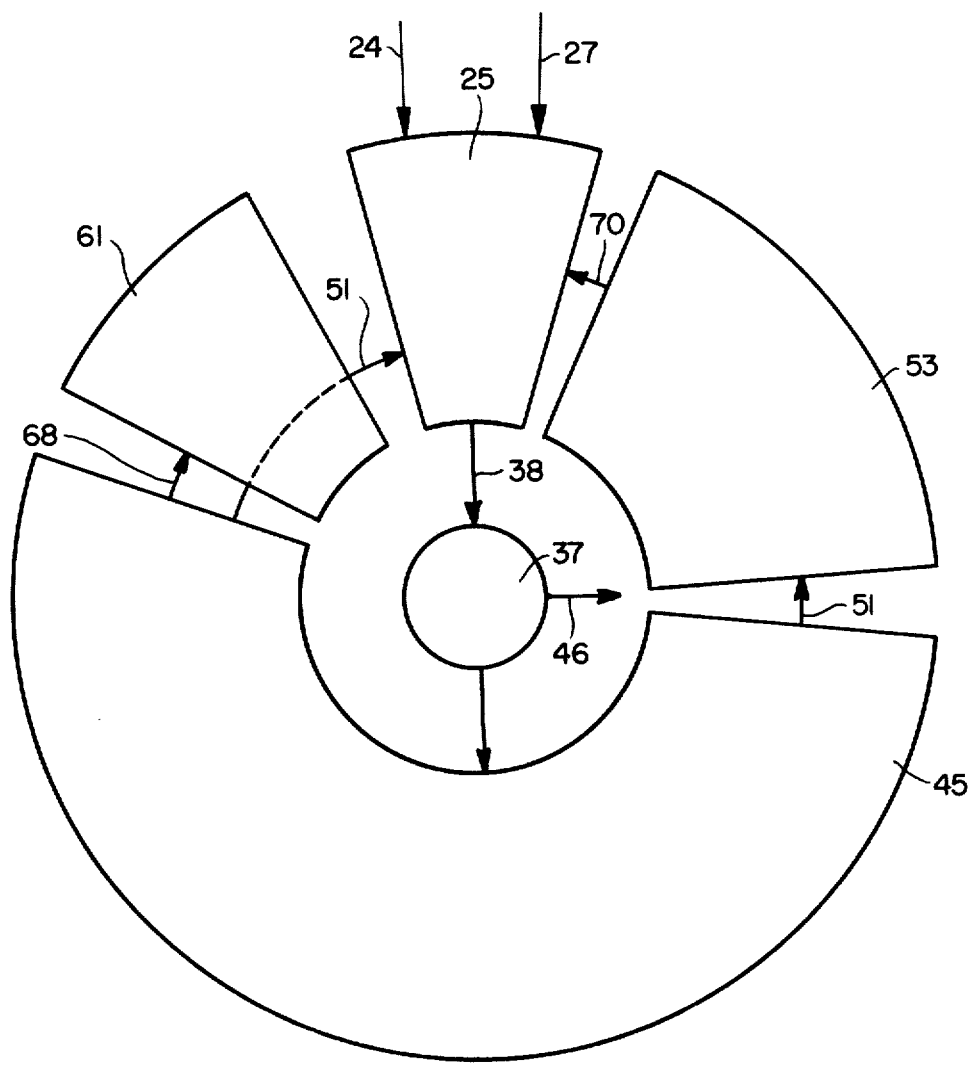
FIG. 4 is a schematic plan view of the FIG. 3 plant showing the fluids flows.

FIG. 4 shows the fluid flows in the aforedescribed integral circular wastewater treatment plant. In brief, the water flows sequentially through first aeration zone 25, second aeration zone 37 to clarification zone 45 where the oxygenated liquor is separated into activated sludge and clarified water. The latter is directed to chlorination zone 61 (if employed) and discharged to receiving water. A portion of the activated sludge is recycled to first aeration zone 25 and the balance transferred to aerobic digestion zone 53 for further aeration. The supernatant liquid may be returned to first aeration zone 25 through stilling well 70. The oxygen gas entering first aeration zone 25 is partially consumed therein, oxygen depleted gas discharged through means 38 to second aeration zone 37 and the further oxygen depleted gas is vented through means 46.

Figure 5:
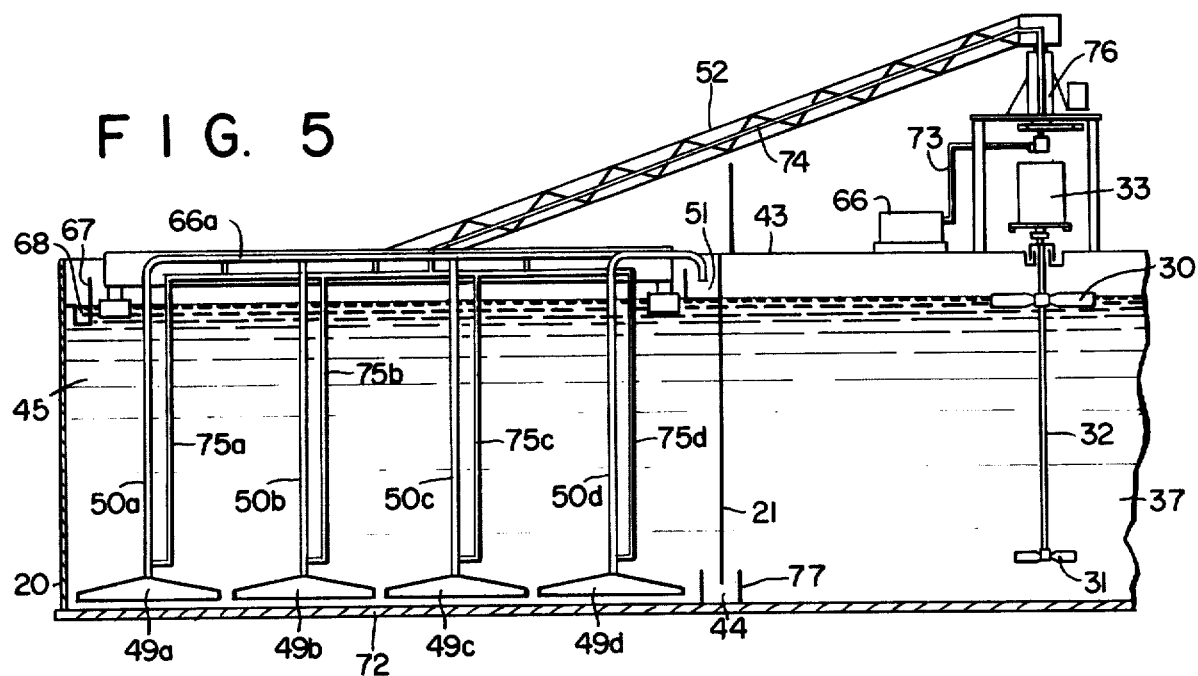
FIG. 5 is an elevation view of the FIG. 3 plant taken in cross section along line A—A.

FIG. 5 is an elevation view of the FIG. 3 plant taken in cross section along line A—A showing the activated sludge collection and removal assembly in greater detail. More particularly a series of sludge pick-up heads 49a–d are transversely spaced across first arcuate clarifier portion 45 and positioned near the floor 72, being respectively supported by hollow shafts 50a–d for flow therethrough to overhead sludge trough 51. Air lift blower 66 mounted on second aeration zone cover 43 is joined through conduits 73 and 74 to each of vertical conduits 75a–d joined to the lower end of shafts 50a–d respectively, and provides the needed suction for drawing sludge upwardly therethrough. Motor 76 moves sludge pick-up bridge assembly 52 around the clarifier arcuate path. The oxygenated sludge flows from second aeration zone 37 into clarifier zone 45 through liquid passage means 44 associated with inner wall 21. The latter comprises vertical projections 77 extending from floor 72 and spaced on either side of inner wall 21 extending downwardly to a position near but spaced from the floor 72 with a narrow gap therebetween.

Figure 6:
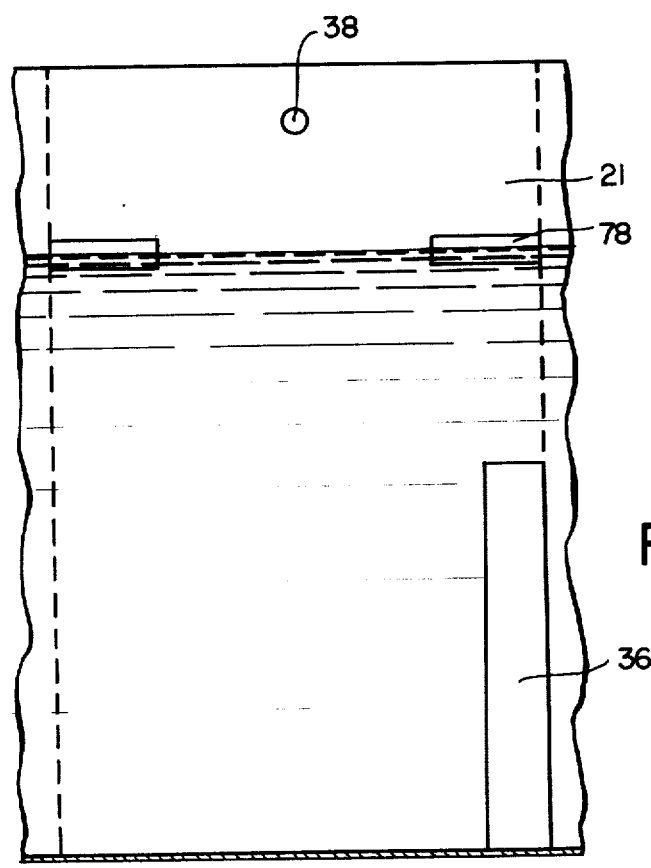
FIG. 6 is another elevation view of the FIG. 3 plant taken in cross section along line B—B.

FIG. 6 is an elevation view of the FIG. 3 plant taken in cross section along line B—B showing the inner wall portion separating first arcuate aeration zone 25 and central second aeration zone 37. Circular opening 38 in the upper portion of inner wall 21 permits restricted flow of oxygen depleted gas from the first to the second aeration zone, while slot opening 36 in the lower portion of inner wall permits restricted flow of first oxygenated liquor from the first to the second zone. Horizontal slots 78 at the liquor level are provided for passage of foam from the first to the second zone.

Figure 7:
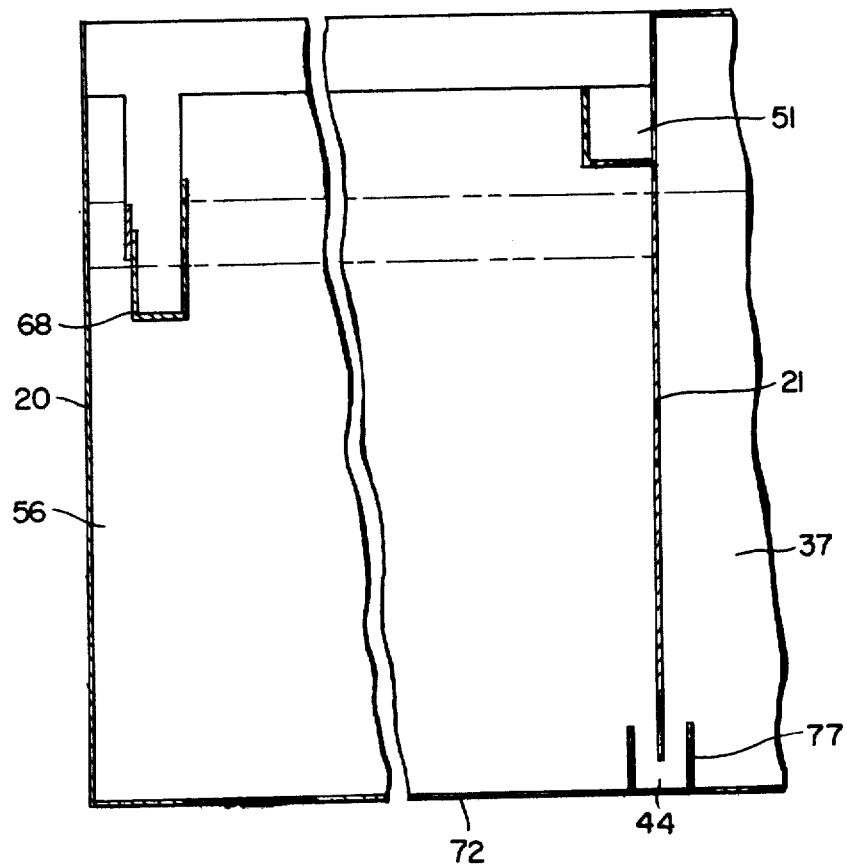
FIG. 7 is still another elevation view of the FIG. 3 plant taken in cross section along line C—C.

FIG. 7 is an elevation view of the FIG. 3 plant taken in cross section along line C—C showing second radial partition 56 separating first arcuate clarifier portion 45 and chlorination zone 61. In this particular embodiment the liquid level in clarifier zone (indicated by higher horizontal dotted line) is above the liquid level in the chlorination zone 61 (indicated by lower horizontal dotted line). Clarified water flows over outlet weir 67 into trough 68 around the perimeter of clarifier 45 and within outer wall 20, and into chlorination zone 61. Sludge trough 51 is shown positioned against the outer side of inner wall 21. Second oxygenated liquor from second aeration zone 37 flows around vertical projections 77 from clarifier floor 72 and beneath inner wall 21 into clarifier 45 for radial outward flow there across as previously described.

Figure 8:
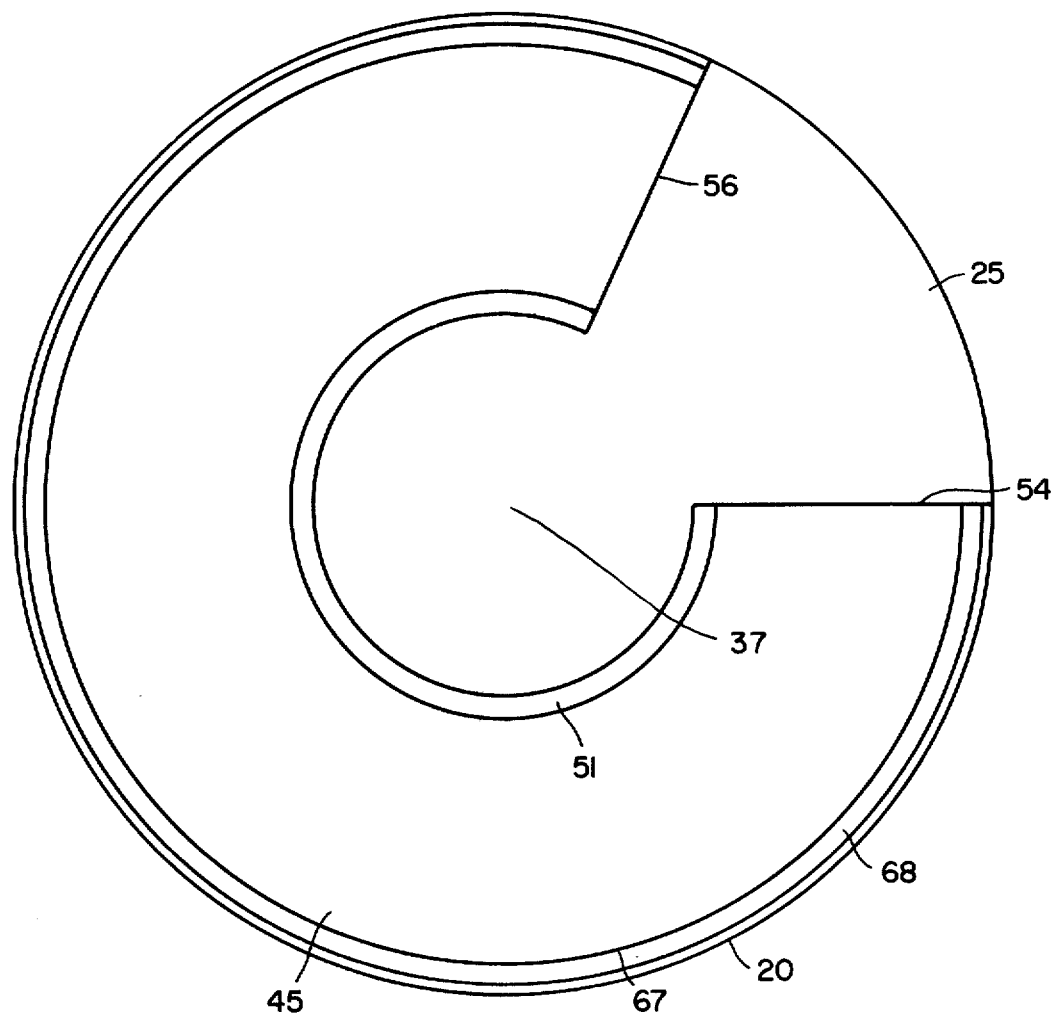
FIG. 8 is a schematic plan view of an alternative integral circular wastewater treatment plant similar to FIG. 4 but with a 295°arcuate clarifier and showing the fluid flows.

FIG. 8 is a schematic plan view of an alternative integral circular wastewater treatment plant differing from the previously described embodiments in that the first aeration zone 25 comprises the entire second arcuate portion and the first arcuate clarifier portion 45 comprises the balance of the intermediate volume between outer wall 20 and inner wall 21. In this arrangement there are no waste treatment zones other than aeration and clarification and the clarifier arc length may be on the order of 295°. The ratio of clarifier cross sectional area to aeration volume may be about 0.192, and the ratio of inner wall radius $R_1$ to the outer wall radius $R_2$ may be about 0.382.

Figure 9:
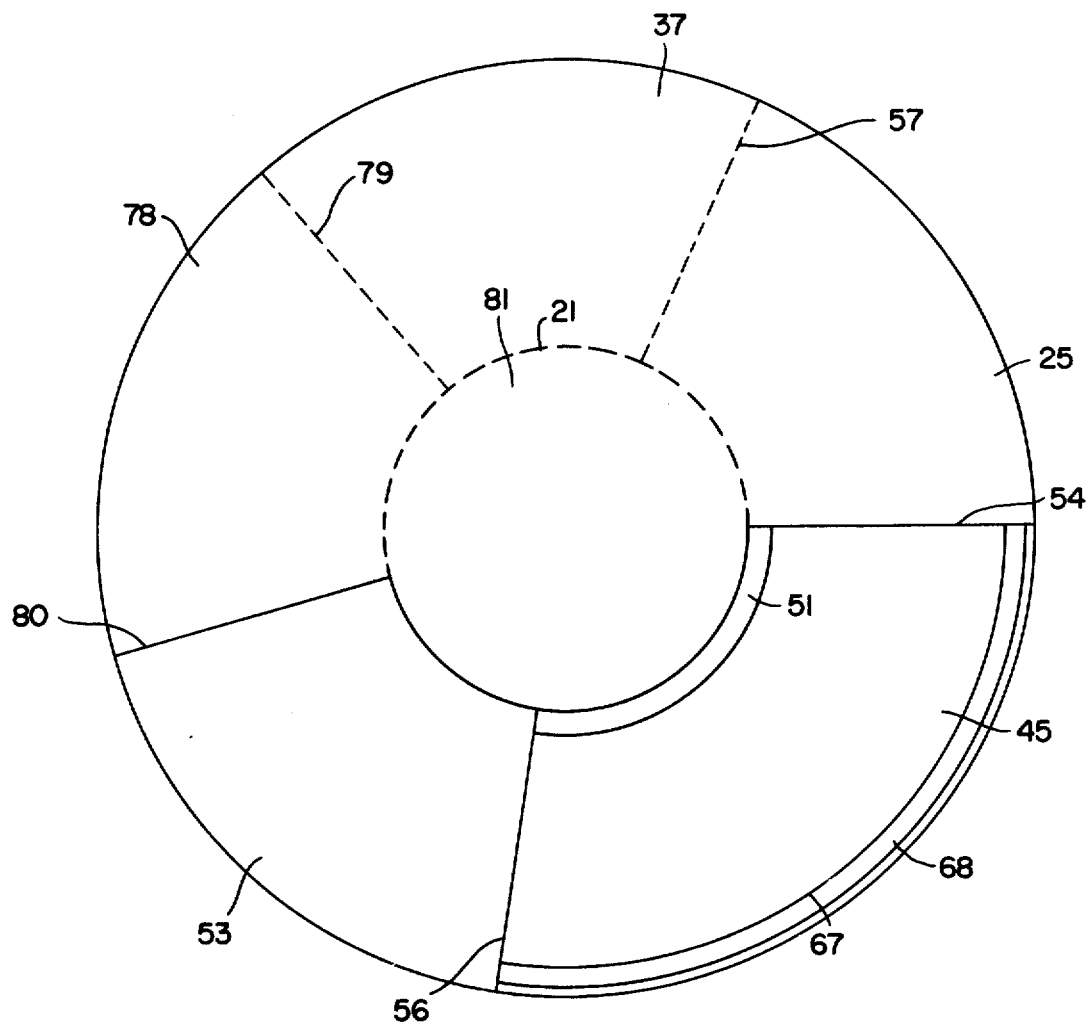
FIG. 9 is a schematic plan view of still another alternative integral circular wastewater treatment plant with three arcuate aeration zones, a fourth center aeration zone and 99°arcuate clarifier, and showing the fluid flows.

FIG. 9 is a schematic plan view of still another alternative integral circular wastewater treatment plant especially suited for treatment of extremely high BOD content wastewater. Four aeration zones are provided and perferably arranged for cocurrent staged flow of oxygen containing gas and wastewater through the four stages. More particularly three arcuate aeration zones, a fourth center aeration zone, a 99° arcuate clarifier and an arcuate aerobic digestion zone are included. As illustrated in FIG. 9, first arcuate aeration zone 25 is separated from arcuate clarifier zone 45 by first radial partition 54 and from second arcuate aeration zone 37 by third radial partition 57. Second arcuate aeration zone 37 and third arcuate aeration zone 78 are separated by fourth radial partition 79. Third arcuate aeration zone 78 and arcuate aerobic digestion zone 53 are separated by fifth radial partition 80, and the opposite end of digestion zone 53 separated from arcuate clarifier zone 45 by second radial partition 56. Fourth aeration zone 81 is located in the center portion of the plant within inner wall 21. With the exception of arcuate clarifier portion 45 the entire plant is enclosed by a cover. The fluid inner connections between the various zones may be identical to those previously discussed and illustrated in FIGS. 6 and 7. By way of illustration, the ratio of clarifier cross-sectional area to aeration volume may be about 0.0316 and the ratio of inner wall radius $R_1$ to the outer wall radius $R_2$ is about 0.467.

Figure 10:
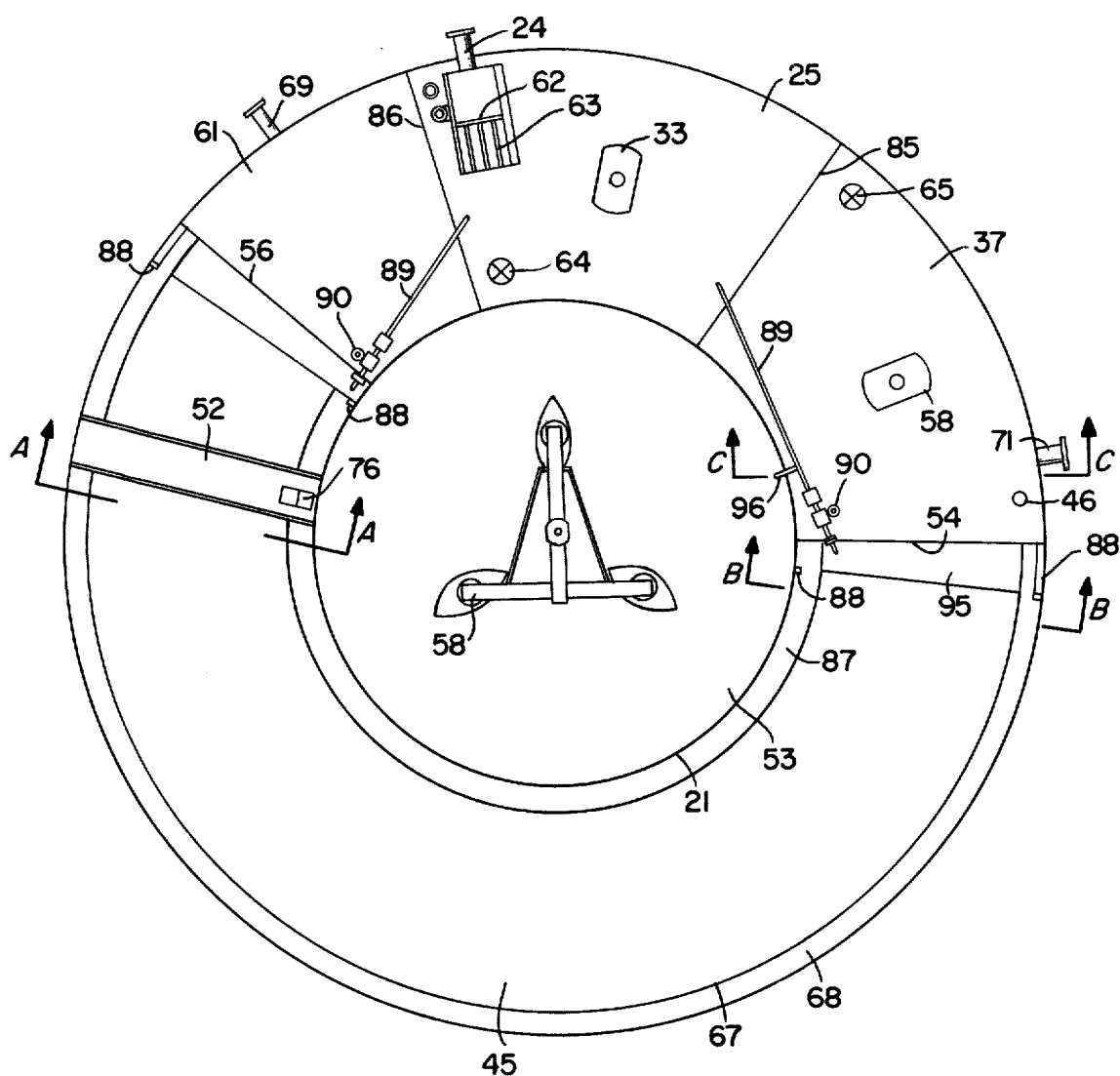
FIG. 10 is a plant view of an additional integral circular wastewater treatment plant showing two arcuate aeration zones, an arcuate chlorination zone, a central aerobic digestion zones, and a 222°clarifier.

FIG. 10 is a plan view of an additional embodiment wherein aerobic digestion zone 53 is located in the central part of the plant within inner wall 21. First aeration zone 25 is within the second arcuate portion and separated on one side from second arcuate aeration zone 37 by third radial partition 85 and from radial chlorination zone 61 on the other side by fourth radial partition 86. Second arcuate aeration zone 37 is separated from first arcuate clarifier portion 45 by first radial partition 54. Oxygenated liquor from second aeration zone 37 enters launder 87 extending around the outer periphery of inner wall 21 within the arcuate clarifier portion 45 and overflows uniformly and continuously into the clarifier for radial flow there across. The clarified effluent water flows through trough 68 into chlorination zone 61 separated from the clarifier zone by second radial partition 56. Settled solids in clarifier 45 are moved into troughs at the extreme ends of the clarifier by a scraper assembly mounted on bridge 52. The latter travels by means of tracks on the inner and outer walls around the clarifier arcuate portion and is driven by reciprocal drive means 76 terminated at each end by bridge stops 88 so that the scraper is active in both directions. The troughs are sloped toward the inner wall 21 and a portion of the collected sludge is recycled through conduits 89 having pumps 90 therein to arcuate first aeration zone 25. The balance of the sludge is directed to central aerobic digestion zone 53 and waste sludge discharged therefrom through conduit 71 passing through second aeration zone 37.

Figure 11:
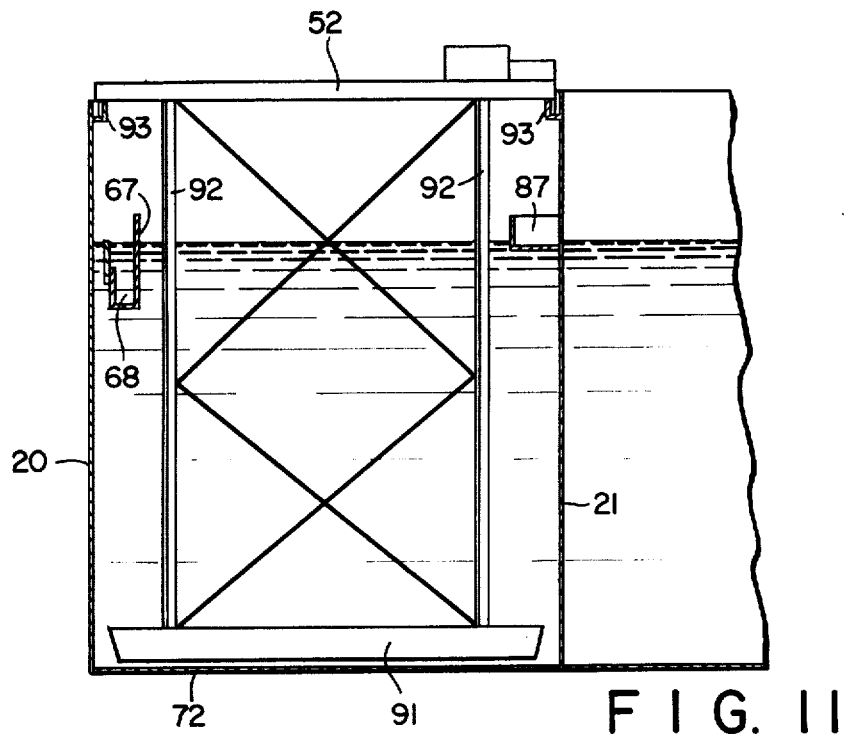
FIG. 11 is an elevation view of the FIG. 10 plant taken in cross section along line A—A.

FIG. 11 is an elevation view of the FIG. 10 plant taken in cross section along line A-A and showing the bridge-sludge scraper assembly. Scraper 91 extends transversely between outer wall 20 and inner wall 21, horizontally aligned slightly above plant floor 72 and is supported from bridge 52 by arms 92. Bridge 52 moves around the arcuate clarifier portion on rollers 93.

Figure 12:
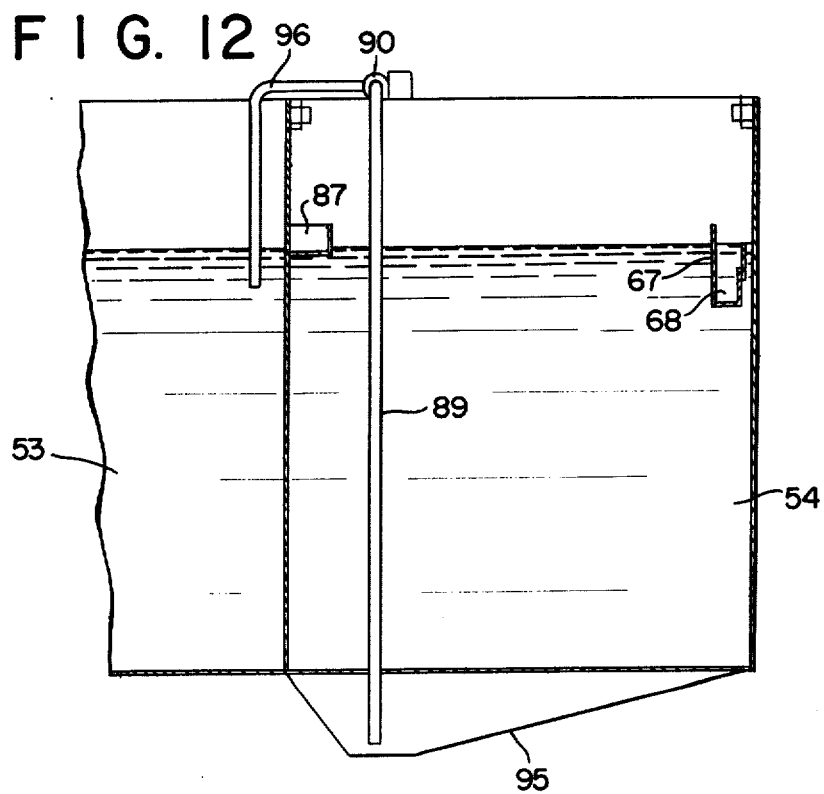
FIG. 12 is another elevation view of the FIG. 10 plant taken in cross section along line B—B.

FIG. 12 is another elevation view of the FIG. 10 plant taken in cross section along line B-B showing the sludge return assembly. The settled solids accumulate in sludge trough 95 at the lower end first radial partition 54 and are drawn upwardly through a vertical section of conduit 89 by sludge return pump 90. The unrecycled portion is directed through branch conduit 96 to aerobic digester 53 for further aeration therein. The horizontal dotted line indicates the liquor level in second aeration zone 37.

Figure 13:
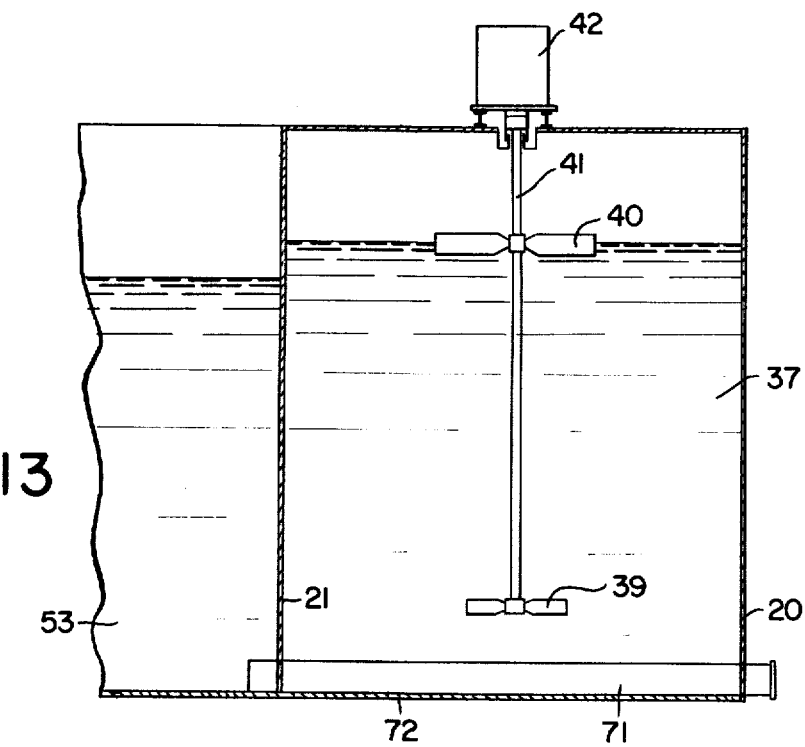
FIG. 13 is still another elevation view of the FIG. 10 plant taken in cross section along line C—C.

FIG. 13 is still another elevation view of the FIG. 10 plant taken in cross section along line C—C showing the second aeration zone fluids mixing and recirculation system and the waste sludge discharge. Conduit 71 extends from central aerobic digestion zone 53 through inner wall 21 and radially across floor 72 from arcuate second aeration zone 37, emerging through outer wall 20.

FIGS. 14–17 compare actual liquor flow paths and sedimentation path lengths for clarifiers of air aerated circular wastewater treatment plants and oxygen aerated circular plants in accordance with this invention. The sedimentation path length has been determined on the assumption of a uniform distribution of aerated liquor over a vertical cross section of area adjacent the inner clarifier wall and a uniform radial distribution of liquid velocities in the FIGS. 14–17 graphs. Curve A represents the sedimentation path length and Curve B represents the actual liquor flow path length.

FIG. 14 shows the clarifier performance of an air aerated plant processing wastewater of 250 mg/l BOD with total suspended solids concentration of 2200 mg/l, whereas FIG. 15 shows clarifier performance in a two step oxygen aerated plant processing wastewater of the same BOD strength but at higher total suspended solids concentration in the aeration zone of 5000 mg/l. It will be apparent from a comparison of these curves that in the air aerated plant of FIG. 14 the actual liquid flow path length only approaches the sedimentation path length with a fully extended 360° clarifier configuration and that any decrease in the clarifier arc length will prevent the plant from effectively producing a low solids content effluent. In marked contrast, with the present invention clarifier arc lengths as low as 260° may be employed with the liquor flow path length exceeding the sedimentation path length, thereby permitting effective solids separation in the clarifier.

Figure 17:
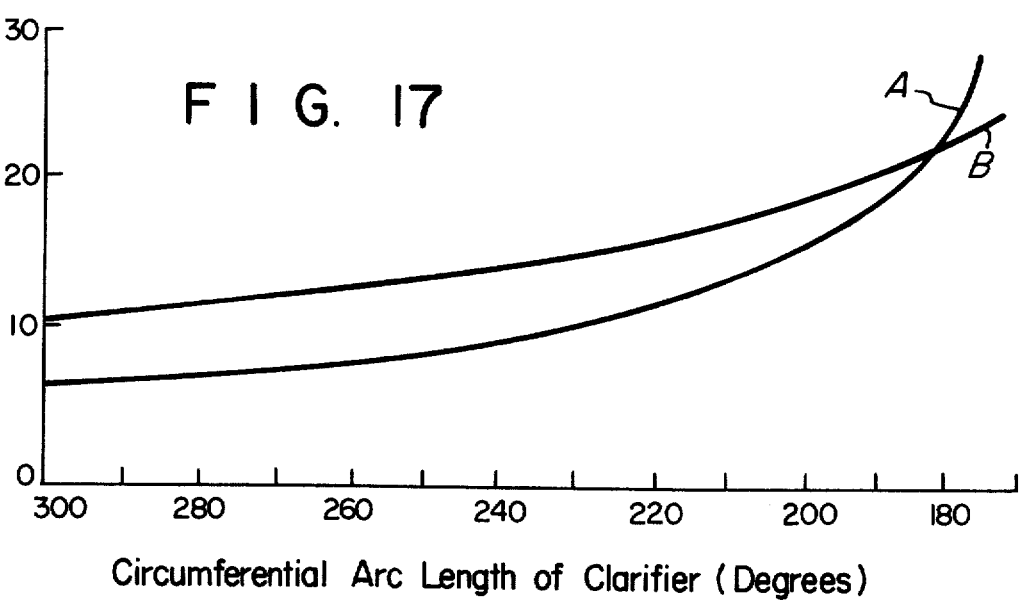
FIG. 17 is a graph showing clarifier performance in oxygen aerated circular plant processing wastewater of 686 mg/1 at total suspended solids concentration (MLSS) of 6500 mg/1.
Figure 16:
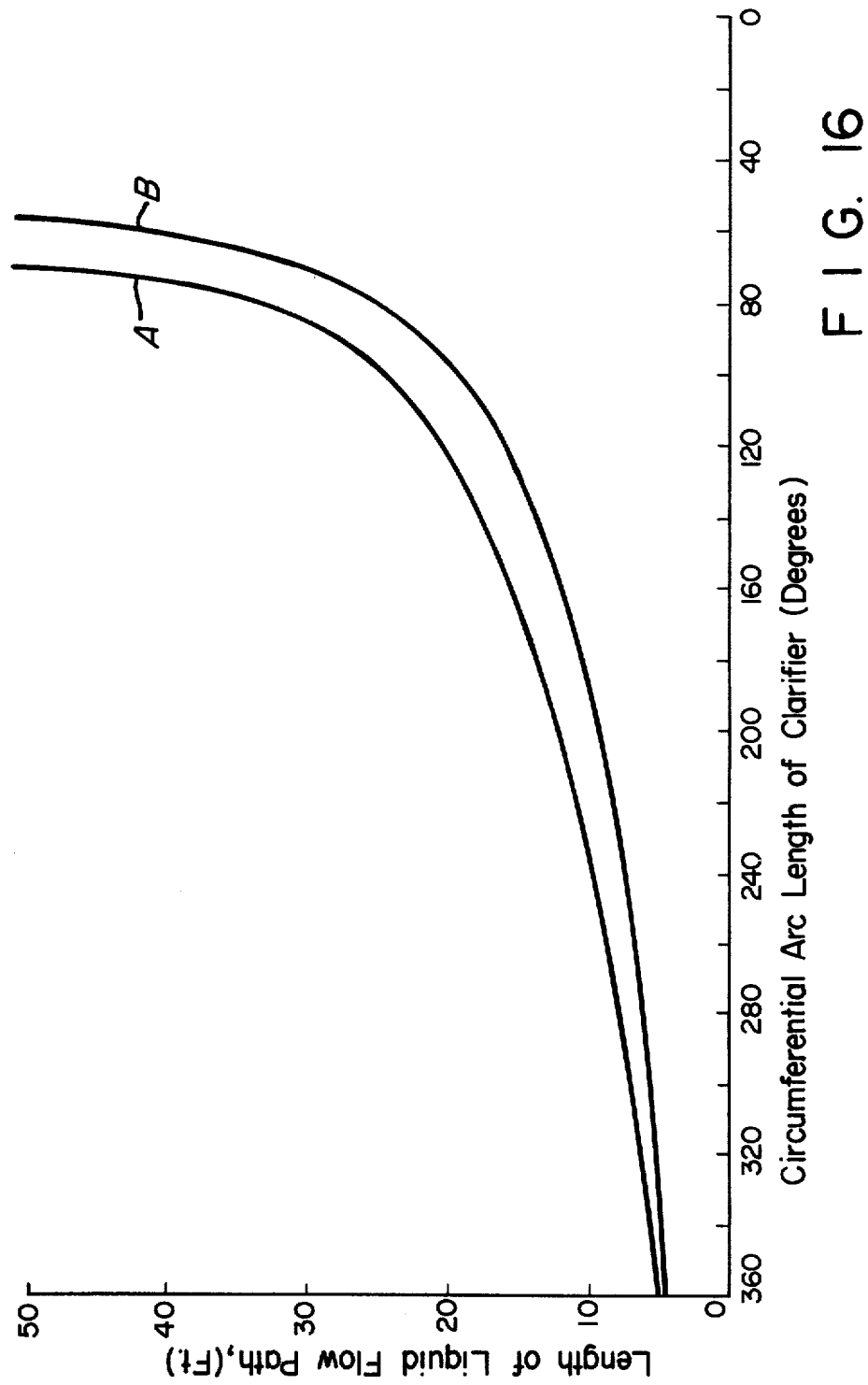
FIG. 16 is a graph showing clarifier performance of an air aerated circular plant processing wastewater of 686 mg/1 BOD in an aeration zone with total suspended solids concentrated (MLSS) of 2200 mg/1.

FIGS. 16 and 17 show clarifier performance of respectively air and oxygen aerated circular plants processing wastewater of 686 mg/1 BOD with total suspended solids concentration (MLSS) of 2200 mg/1 (air aerated zone) and 6500 mg/1 (each of the two oxygen aerated zones).

As in the case of the FIG. 14 lower strength wastewater, FIG. 16 shows that with higher BOD content wastewater, air aerated circular plants also require a fully extended 360° clarifier configuration, i.e. sedimentation path length curve A is above actual liquor flow path length curve B over the entire range of circumferential arc length of clarifier. However, FIG. 17 shows that circumferential arc lengths greater than about 180° are sufficient to provide effective separation of solids from water and a purified effluent. It is significant to note that the air aerated circular plants represented by FIGS. 14 and 16 do not have the flexibility for the inclusion of treatment zones such as the afore described aerobic digestion and chlorination zones included in plants based on this invention.

Within the broad range of 90° to 330° clarifier arc length, it is preferred to employ 180° to 300° clarifier arc lengths when processing relatively low strength waste water of less than 300 mg/1, and 90° to 240° clarifier arc lengths when processing relatively high strength waste water of greater than 300 mg/1. Also, it is preferred to employ 180° to 330° clarifier arc lengths when contact stabilization is practiced in the circular integral plant of this invention, i.e. a relatively small aeration stage of short liquor residence time to remove supernatant liquid and partially concentrate the solids for further aeration.

The aforementioned preferred ranges reflect the general tendency for optimum clarifier arc length to decrease as the ratio of aeration zone area to arcuate clarifier area increases, the larger aeration zone area being required to treat higher BOD concentrations.

Table I summarizes suitable process conditions for the oxygen aerated integral circular plant of this invention in comparison with air aerated plants for treatment of typical municipal waste water.

TABLE I

| Process Variable | Oxygen System | Air System |
|---|---|---|
| Mixed Liquor D.O. Level (mg/l) | 4-8 | 1-2 |
| Aeration Detention Time (hrs.) | 1-3 | 3-8 |
| MLSS Concentration (mg/l) | 4000-8000 | 1000-3000 |
| MLVSS Concentration (mg/l) | 3000-6000 | 900-2600 |
| $\frac{Lb. BOD/day}{lb. MLVSS}$ | 0.5-1.55 | 0.25-0.80 |
| Sludge Volume Index (Mohlman) (mg/l) | 30-70 | 100-150 |
| Recycle Sludge Concentration (mg/l) | 15000-50000 | 5000-15000 |

Also in the preferred practice of this invention, the ratio of clarifier arcuate cross-sectional area to the total aeration zone volume may be related to low and high waste water BOD feed concentrations. For influent waste water BOD concentrations of less than about 300 mg/1, the arcuate clarifier area/aeration zone ratio is preferably between about 0.10 ft$^{-1}$ and 0.25 ft$^{-1}$, while the comparable ratios for air aerated circular plants are in the range of about 0.02 ft$^{-1}$ to 0.10 ft$^{-1}$. For influent waste water BOD concentrations above 300 mg/1, the arcuate clarifier area/aeration zone ratio is preferably between about 0.05 ft$^{-1}$ and 0.11 ft$^{-1}$, whereas the comparable ratios for air aerated circular plants are in the range of about 0 to 0.04 ft$^{-1}$. Summarizing, for low strength waste waters, the arcuate clarifier preferably occupies a comparatively large portion of the total plant area whereas for high strength waste water, the arcuate clarifier preferably occupies a relatively smaller fraction of the total plant area.

Table II compares the aeration zone cross-sectional areas and the clarifier areas required for air aerated circular plants and oxygen aerated circular integral plants with arcuate clarification portions, all based on $1 \times 10^6$ gal/day waste water flows.

TABLE II

| Type Aeration | BOD (mg/l) | MLSS (mg/l) | Aeration Area (ft$^2$) | Clarifier Area (ft$^2$) |
|---|---|---|---|---|
| Air | 200 | 2200 | 2943.6 | 1720.5 |
| Air | 250 | 2200 | 3679.5 | 1720.5 |
| Air | 686 | 2200 | 10100.0 | 1720.5 |
| O$_2$ | 200 | 5000 | 784.96 | 1410.25 |
| O$_2$ | 250 | 5000 | 981.2 | 1410.25 |
| O$_2$ | 250 | 5500 | 981.2 | 1551.3 |
| O$_2$ | 686 | 6500 | 2074.5 | 1667.7 |

The above table shows the oxygen system to have a substantially smaller aeration volume than the air system (liquid depths are constant, = 12 ft.) at typical operating conditions. As an example, at 200 mg/1 BOD, the aeration volume of the typical oxygen system is about 25 percent of the corresponding air system volume. The reason for this disparity is shown in Table I. The air system is able to attain only a very low concentration level of active biological solids (MLVSS), typically 900-2600 mg/1, and thus must supply extremely large aeration tankage in order to provide the long liquor retention times necessary for reasonable BOD removals. The oxygen system, however, having inherently higher biological solids levels, maintains correspondingly higher levels of biological assimilation and is able thereby to operate with much smaller aeration chambers.

The wastewater treatment capability of an aeration system can be described in terms of an operational range of organic loadings to the system, expressed as lbs. BOD applied/day/100 ft$^3$ of aeration zone volume. Air systems typically operate at values of 30–60 lbs. BOD/day/1000 ft$^3$, while oxygen system of this invention can operate at 60–300 lbs. BOD/day/1000 ft$^3$. For any given BOD loading, then, the oxygen aeration system will be smaller in size than the corresponding air system. It has previously been indicated that the ratio of the inner wall radius ($R_1$) to the outer wall radius ($R_2$) is between 0.25 and 0.70.

If $R_1/R_2$ exceeds 0.70, the intermediate volume becomes too narrow to accommodate arcuate aeration zones with uniformly good mixing characteristics, i.e. the zones would be excessively long relative to their width. Also, the arcuate clarifier portion would be so narrow as to develop aberant flow phenomena, with a prohibitively low actual liquor radial flow path to the outer wall. Such proximity of inlet and outlet areas is likely to promote channeling and short-circuiting. if $R_1/R_2$ is less than 0.25, the center zone becomes very small in area compared to the total plant area. The inner wall of the arcuate clarifier is very short circumferentially and defines a very localized oxygenated liquor distribution area which tends to create turbulence which is detrimental to liquid-solids separation. A preferred balance of the foregoing considerations is an $R_1/R_2$ range between 0.30 and 0.60.

Table III summarizes suitable dimensions and capacities of integral circular plants processing between 0.5 and $3.0 \times 10^6$ gal/day of municipal waste water having 200 mg/l BOD.

Also as previously discussed, the waste water treatment method of this invention requires $V_E/V_I$ ratios of between 0.1 and 0.5 wherein $V_E$ is the radial liquid velocity at the outer concentric larger diameter liquid effluent discharge arc, and $V_I$ is the radial liquor velocity of the inner smaller diameter inlet arc. Ratios below 0.1 inherently require excessively high $V_I$ values which tend to scour solids from the clarifier sludge blanket, produce turbulence and non-uniform flow conditions which impair liquid-solids separation. Ratios above 0.5 do not provide sufficient velocity reduction in the radial path across the arcuate clarifier for effective solids separation before the liquid reaches the plant outer wall. By way of example, assuming a sludge volumetric recycle ratio of 0.3 so that $R/Q = 0.3$ wherein R is the volumetric activated sludge recycle flow rate and Q is the volumetric flow rate of liquid effluent from the clarification zone, $V_E/V_I$ values for the FIGS. 8 and 9 embodiments are 0.294 and 0.359 respectively.

transfer means are low, as in areas far removed from the region of liquor introduction. Sedimentation in the liquor transfer means may produce poor distribution across the clarifier inner diameter inlet arc.

Although preferred embodiments have been described in detail, it will be appreciated that other embodiments are contemplated only with modification of the disclosed features, as being within the scope of the invention.

What is claimed is:

1. Wastewater treatment apparatus comprising:
   a. A circular tank outer wall;
   b. A circular inner wall concentric with and spaced from said outer wall forming an inner volume and intermediate volume between said inner and outer walls, such that the ratio of the inner wall radius ($R_1$) to the outer wall radius ($R_2$) is between 0.25 and 0.70;
   c. A first radial partition extending across said intermediate volume between and joined at opposite edges to said inner and outer walls;
   d. A second radial partition extending across said intermediate volume between and joined at opposite edges to said inner and outer walls, being spaced from said first raidal partition so as to form a first arcuate portion of said intermediate volume bounded by segments of said inner and outer walls comprising between 90° and 330° of their respective circumferences, and a second arcuate portion comprising the remainder of said intermediate volume;
   e. First fluid mixing and recirculation means within said outer wall in a first part other than said first arcuate portion and a cover enclosing said first part

TABLE III

| | DIMENSIONS & CAPACITIES OF INTEGRAL CIRCULAR PLANTS | | | | | | |
|---|---|---|---|---|---|---|---|
| Nominal Daily Flow[1] | 0.5 MGD | 0.75 MGD | 1.0 MGD | 1.5 MGD | 2.0 MGD | 2.5 MGD | 3.0 MGD |
| Overall Dimensions, ft, In.  A[2] | 15'-4" | 18'-8" | 21'-6" | 26'-4" | 30'-4" | 34'-0" | 37'-4" |
| B[2] | 40'-0" | 48'-10" | 56'-2" | 68'-8" | 79'-0" | 88'-4" | 96'-8" |
| C[2] | 43'-4" | 53'-0" | 61'-0" | 74'-4" | 85'-8" | 95'-8" | 104'-8" |
| Sidewater Depth (All Zones) — Ft. | 12'-0" | 12'-0" | 12'-0" | 12'-0" | 12'-0" | 12'-0" | 12'-0" |
| Freeboard (All Covered Zones)—Ft. | 3'-0" | 3'-0" | 3'-0" | 3'-0" | 3'-0" | 3'-0" | 3'-0" |
| Aeration Zones — Volume, Gals. | 32,500 | 49,100 | 65,100 | 98,200 | 130,200 | 163,000 | 196,400 |
| MLVSS Concentration, mg/l | 4,500 | 4,500 | 4,500 | 4,500 | 4,500 | 4,500 | 4,500 |
| F/M Ratio (Food/Biomass) | 0.68 | 0.68 | 0.68 | 0.68 | 0.68 | 0.68 | 0.68 |
| Oxygen Required—Lbs/Day | 730 | 1,095 | 1,460 | 2,190 | 2,920 | 3,650 | 4,380 |
| Aerator Power—1st Zone (HP) | 5 | 7.5 | 10 | 15 | 20 | 25 | 30 |
| Aerator Power—2nd Zone (HP) | 3 | 5 | 7.5 | 10 | 15 | 20 | 25 |
| Clarification Zone—Volume, Gals. | 75,000 | 112,500 | 150,000 | 225,000 | 300,000 | 375,000 | 450,000 |
| Overflow Rate—GPD/Ft² | 600 | 600 | 600 | 600 | 600 | 600 | 600 |
| Weir Rate—GPD/Ft² | 4,950 | 6,505 | 7,000 | 8,560 | 9,900 | 11,100 | 12,100 |
| Aerobic Digestion Zone—Vol. Gals. | 18,750 | 28,100 | 37,500 | 56,250 | 75,000 | 93,750 | 112,500 |
| Oxygen Required—Lbs/Day | 250 | 375 | 500 | 750 | 1,000 | 1,250 | 1,500 |
| Aeration Power (HP) | 3 | 5 | 7.5 | 10 | 15 | 20 | 25 |

(A) Diameter of central second aeration zone ($R_1$)
(B) Diameter of outer wall ($2R_2$) without aerobic digestion zone (FIG. 8)
(C) Diameter of outer wall ($2R_2$) with aerobic digestion zone (FIG. 4)
[1]Peak flows considered 2.5 times greater than nominal daily flows; BOD is 200 mg/l.
[2]Based on 10" thick concrete for all internal walls.

It will be noted thus in the method aspect of this invention, the final aeration zone is in the central circular zone of the plant within the inner wall. This is because the oxygenated liquor from this zone may be readily uniformly distributed into the adjoining arcuate clarifier zone, whereas such uniform distribution is more difficult if the final aeration zone is in the second arcuate portion. The latter requires launder or trough means to transfer the liquor to the clarifier, and in which sedimentation can occur. This is a particularly acute problem when liquor velocities in the liquor positioned over said first fluid mixing and recirculation means to form a first aeration zone;
   f. First passage means for introducing oxygen gas in said first aeration zone;
   g. Second passage means for introducing feed wastewater and thickened activated sludge to said first aeration zone;
   h. Second fluid mixing and recirculation means within said outer wall in a second part other than said first arcuate portion and a second cover enclosing said second part positioned over said second fluid mixing and recirculation means to form a second aeration zone;

i. First gas interzone transfer means spaced from first passage means (f) for discharging oxygen-depleted gas from said first aeration zone and introducing same to said second aeration zone as the oxygen-containing gas therefore;

j. First liquor interzone transfer means for discharging first oxygenated liquor from said first aeration zone and introducing same to said second aeration zone for mixing therein with said oxygen-containing gas;

k. Gas vent means spaced from first gas interzone transfer means (i) for discharging oxygen-further depleted gas from said second aeration zone;

l. Liquor passage means for discharging second oxygenated liquor from said second aeration zone;

m. Means for uniformly distributing oxygenated liquor in said first arcuate portion of said intermediate volume around the inner wall segment for radial flow across said first arcuate portion for both clarification of said liquor and thickening of activated sludge therein;

n. Trough means around the outer wall segment upper part of said first arcuate portion for discharging clarified water thereform; and o. Means for collecting and removing thickened activated sludge from the bottom part of said first arcuate portion and returning at least part of said sludge to said second passage means (g).

2. Apparatus according to claim 1 wherein said inner volume within said circular inner wall comprises said second aeration zone.

3. Apparatus according to claim 1 with a third radial partition extending across said intermediate volume between and joined at opposite edges to said inner and outer walls within said second arcuate portion, third fluid mixing and recirculation means within said outer wall in a third part other than said first arcuate portion, a third cover enclosing said third part positioned over said third fluid mixing and recirculation means to form a third aeration zone, second gas interzone transfer means joined to gas vent means (k) for introducing said oxygen - further depleted gas from said second aeration zone to said third aeration zone, second liquor interzone transfer means joined to liquor passage means (l) for introducing second oxygenated liquor to said third aeration zone, other liquor passage means for discharging third oxygenated liquor from said third aeration zone and joining uniform distribution means (m) and other gas vent means spaced from said second gas interzone transfer means for discharging oxygen - still further depleted gas from said third aeration zone.

4. Apparatus according to claim 1 with a third radial partition extending across said intermediate volume between and joined at opposite edges to said inner and outer walls within said second arcuate portion, third fluid mixing and recirculation means within said outer wall in a third part other than said first arcuate portion, a third cover enclosing said third part positioned over said third fluid mixing and recirculation means to form a thickened sludge digestion zone, passage means for introducing oxygen gas to said sludge digest zone, sludge transfer means joined to sludge return means (o) for transferring the unreturned thickened sludge to said sludge digestion zone, means for discharging digested thickened sludge from said sludge digestion zone and still other gas vent means spaced from the oxygen gas introduction passage means for discharging oxygen - depleted gas from said sludge digestion zone.

5. Apparatus according to claim 1 wherein ratio of the inner wall radius ($R_1$) to the outer wall radius ($R_2$) is between 0.30 and 0.60.

6. Apparatus according to claim 1 wherein a rotatable impeller positioned at the liquor surface, a subsurface propeller positioned beneath said propeller a common shaft joining said impeller and said propeller and motor drive means connected to said shaft comprise each of said first and second fluid mixing and recirculation means.

7. Apparatus according to claim 1 wherein said means (o) for collecting and removing thickened activated sludge comprises a multiplicity of sludge pickup heads each positioned near the bottom of said first arcuate portion and spaced between said inner and outer walls, a multiplicity of conduits each with a lower end joined to a sludge pick-up head and an upper end in flow communication with said passage means (g) for introducing thickened activated sludge to said first aeration zone, a bridge extending across and above said intermediate volume and supporting the pick-up head - multiple conduit - assembly, mechanical drive means for moving said bridge in an arcuate path repetitively around said first arcuate portion between said first and second radial partitions, and pump means joined to said overhead manifold for moving thickened sludge therethrough.

8. Apparatus according to claim 1 wherein a third radial partition extends across said intermediate volume between and joined at opposite edges to said inner and outer walls within said second arcuate portion to form said second aeration zone.

9. Apparatus according to claim 4 with a fourth radial partition extended across said intermediate volume between and joined at opposite edges to said inner and outer walls within said second arcuate portion, spaced from and between said first and third radial partitions, and a chlorination zone within said outer wall in a fourth part other than said first arcuate portion, with means for introducing the clarified water discharged from said first arcuate portion to said chlorination zone, and means for discharging disinfected effluent from said chlorination zone.

10. Apparatus according to claim 9 wherein said second arcuate portion comprises said sludge digestion zone third part between said first and fourth radial partitions, said first aeration zone first part between said third and fourth radial partitions, and said chlorination zone fourth part between said second and third radial partitions, and said inner volume within said circular inner wall comprises said second aeration zone second part.

11. Wastewater treatment apparatus comprising:

a. A circular tank outer wall;

b. A circular inner wall concentric with and spaced from said outer wall forming an inner volume and intermediate volume between said inner and outer walls, such that the ratio of the inner wall radius ($R_1$) to the outer wall radius ($R_2$) is between 0.25 and 0.70;

c. A first radial partition extending across said intermediate volume between and joined at opposite edges to said inner and outer walls;

d. A second radial partition extending across said intermediate volume between and joined at opposite edges to said inner and outer walls, being spaced from said first radial partition so as to form a first arcuate portion of said intermediate volume bounded by segments of said inner and outer walls comprising between 90° and 330° of their respective circumferences, and a second arcuate portion comprising the remainder of said intermediate volume.

e. First fluid mixing and recirculation means within said outer wall in a first part of said second arcuate portion and a cover enclosing said first part positioned over said first fluid mixing and recirculation means to form a first aeration zone;

f. First passage means for introducing oxygen gas in said first aeration zone;

g. Second passage means for introducing feed wastewater and thickened activated sludge to said first aeration zone;

h. Second fluid mixing and recirculation means within said inner wall in said inner volume and a second cover enclosing said inner volume positioned over said second fluid mixing and recirculation means to form a second final aeration zone;

i. First gas interzone transfer means spaced from first passage means (f) for discharging oxygen-depleted gas from said first aeration zone and introducing same to said second aeration zone as the oxygen-containing gas therefor;

j. First liquor interzone transfer means for discharging first oxygenated liquor from said first aeration zone and introducing same to said second aeration zone for mixing therein with said oxygen-containing gas;

k. Gas vent means spaced from first gas interzone transfer means (i) for discharging oxygen-further depleted gas from said second aeration zone;

l. Liquor passage means for discharging second oxygenated liquor from said second aeration zone;

m. Means for uniformly distributing oxygenated liquor in said first arcuate portion of said intermediate volume around the inner wall segment for radial flow across said first arcuate portion for both clarification of said liquor and thickening of activated sludge therein;

n. Trough means around the outer wall segment upper part of said first arcuate portion for discharging clarified water therefrom; and o. Means for collecting and removing thickened activated sludge from the bottom part of said first arcuate portion and returning at least part of said sludge to said second passage means (g).

12. Wastewater treatment apparatus comprising:

a. A circular tank outer wall;

b. A circular inner wall concentric with and spaced from said outer wall forming an inner volume and intermediate volume between said inner and outer walls, such that the ratio of the inner wall radius ($R_1$) to the outer wall radius ($R_2$) is between 0.25 and 0.70;

c. A first radial partition extending across said intermediate volume between and joined at opposite edges to said inner and outer walls;

d. A second radial partition extending across said intermediate volume between and joined at opposite edges to said inner and outer walls, being spaced from said first radial partition so as to form a first arcuate portion of said intermediate volume bounded by segments of said inner and outer walls comprising between 90° and 330° of their respective circumferences, and a second arcuate portion comprising the remainder of said intermediate volume;

e. First fluid mixing and recirculation means within said outer wall in a first part in said second arcuate portion and a cover enclosing said first part positioned over said first fluid mixing and recirculation means to form a first aeration zone;

f. First passage means for introducing oxygen gas in said first aeration zone;

g. Second passage means for introducing feed wastewater and thickened activated sludge to said first aeration zone;

h. A third radial partition extending across said intermediate volume between and joined at opposite edges to said inner and outer wall within said second arcuate portion;

i. Second fluid mixing and recirculation means within said outer wall in a second part in said second arcuate portion and a second cover enclosing said second part positioned over said second fluid mixing and recirculation means to form a second aeration zone;

j. First gas interzone transfer means spaced from first passage means (f) for discharging first oxygen-depleted gas from said first aeration zone and introducing same to said second aeration zone as the oxygen-containing gas therefor;

k. First liquor interzone transfer means for discharging first oxygenated liquor from said first aeration zone and introducing same to said second aeration zone for mixing therein with said oxygen-containing gas;

l. Gas vent means spaced from first gas interzone transfer means (i) for discharging second oxygen-depleted gas from said second aeration zone;

m. Liquor passage means for discharging second oxygenated liquor from said second aeration zone;

n. Third fluid mixing and recirculation means within said inner wall in said inner volume and a third cover enclosing said inner volume positioned over said third fluid mixing and recirculation means to form a final aeration zone;

o. Third passage means for introducing oxygen partially-depleted gas from a preceding aeration zone to said final aeration zone;

p. Fourth passage means for introducing partially oxygenated liquor from a preceding aeration zone to said final aeration zone;

q. Gas vent means for discharging oxygen finally depleted gas from said final aeration zone;

r. Liquor passage means for discharging finally oxygenated liquor from said final aeration zone;

s. Means for uniformly distributing finally oxygenated liquor in said first arcuate portion of said intermediate volume around the inner wall segment for radial flow across said first arcuate portion for both clarification of said liquor and thickening of activated sludge therein;

t. Trough means around the outer wall segment upper part of said first arcuate portion for discharging clarified water therefrom; and u. Means for collecting and removing thickened activated sludge from the bottom part of said first arcuate portion and returning at least part of said sludge to said second passage means(g).

13. Apparatus according to claim 1 wherein said first aeration zone is in a first part in said second arcuate portion and said inner volume within said circular inner wall comprises the said second and final aeration zone.

14. Apparatus according to claim 1 wherein said inner volume within said inner wall comprises a final aeration zone.

* * * * *

UNITED STATES PATENT OFFICE
CERTIFICATE OF CORRECTION

Patent No. 3,890,231          Issue Date June 17, 1975

Inventor(s) L. M. LaClair et al

It is certified that error appears in the above-identified patent and that said Letters Patent are hereby corrected as shown below:

Column 2, line 43, delete "strength" and substitute --stream--.

Column 2, line 62, "foreshorting" should read --foreshortening--.

Column 4, line 8, delete "between" and substitute --around--.

Column 5, line 16, "witht" should read --with--.

Column 6, lines 25-30, the formula expression should read $$-- \quad \frac{V_E}{V_I} = \left(\frac{Q}{Q+R}\right)\left(\frac{R_1}{R_2}\right) \quad ; \text{ and } --.$$

Column 6, line 52, "disgestion" should read --digestion--.

Column 7, line 7, "zones" should read --zone--.

Column 7, line 55, "continuously" should read --continuous--.

Column 17, line 52, "100" should read --1000--.

Column 16, line 25, "raidal" should read --radial--.

Column 17, line 26, "thereform" should read --therefrom--.

Column 17, line 63, "digest" should read --digestion--.

Column 18, line 4, after "wherein" insert --the--.

Column 20, line 54, "oxygenfinally" should read --oxygen finally -

Signed and Sealed this fourth Day of November 1975

[SEAL]

Attest:

RUTH C. MASON
Attesting Officer

C. MARSHALL DANN
Commissioner of Patents and Trademarks